United States Patent
Yoshikawa et al.

(10) Patent No.: US 11,893,546 B2
(45) Date of Patent: Feb. 6, 2024

(54) AUTOMATED ASSET MANAGEMENT AND PLANNING

(71) Applicant: Fracta, Redwood City, CA (US)

(72) Inventors: Daichi Yoshikawa, Cupertino, CA (US); Takashi Kato, Menlo Park, CA (US); Yongyang Wang, San Mateo, CA (US); Tomohiro Kawaji, Redwood City, CA (US); Joel Michael Weingarten, Pleasanton, CA (US)

(73) Assignee: Fracta, Redwood City, CA (US)

( * ) Notice: Subject to any disclaimer, the term of this patent is extended or adjusted under 35 U.S.C. 154(b) by 947 days.

(21) Appl. No.: 16/597,774

(22) Filed: Oct. 9, 2019

(65) Prior Publication Data

US 2020/0111062 A1    Apr. 9, 2020

Related U.S. Application Data

(63) Continuation-in-part of application No. PCT/US2019/024139, filed on Mar. 26, 2019, and a continuation-in-part of application No. 16/365,466, filed on Mar. 26, 2019, and a continuation-in-part of application No. 16/365,522, filed on Mar. 26, 2019,
(Continued)

(51) Int. Cl.
*G06Q 10/20*    (2023.01)
*G06Q 50/06*    (2012.01)
*G06Q 10/0635*    (2023.01)

(52) U.S. Cl.
CPC ......... *G06Q 10/20* (2013.01); *G06Q 10/0635* (2013.01); *G06Q 50/06* (2013.01)

(58) Field of Classification Search
CPC ..... G06Q 10/20; G06Q 10/0635; G06Q 50/06
See application file for complete search history.

(56) References Cited

U.S. PATENT DOCUMENTS

| | | |
|---|---|---|
| 5,731,991 A | 3/1998 | Kinra |
| 6,556,924 B1 | 4/2003 | Kariyawasam |
| 6,862,540 B1 | 3/2005 | Welch |

(Continued)

FOREIGN PATENT DOCUMENTS

| | | |
|---|---|---|
| CN | 201229289 | 4/2009 |
| CN | 104281921 | 1/2015 |

(Continued)

OTHER PUBLICATIONS

U.S. Department of Transportation "Work Zone Road User Costs" DOT; White Paper [online]. Dec. 2011 [retrieved Dec. 6, 2019]. Retrieved from the Internet: <URL: https://ops.fhwa.dot.gov/wz/resources/publications/fhwahop 12005/fhwahop 12005.pdf>.

(Continued)

*Primary Examiner* — Roy Y Yi
*Assistant Examiner* — Geoffrey T Evans
(74) *Attorney, Agent, or Firm* — Wissing Miller LLP

(57) ABSTRACT

Systems and methods for automated or computer assisted planning of pipe replacement projects includes searching a database of pipe segments each having assigned or calculated failure risk parameters. The searching algorithm looks (Continued)

for connected pipe segments falling within a customer's specified project size and identifies potential projects having a relatively high combined high failure risk.

23 Claims, 14 Drawing Sheets

Related U.S. Application Data and a continuation-in-part of application No. PCT/US2019/024141, filed on Mar. 26, 2019.

(60) Provisional application No. 62/858,266, filed on Jun. 6, 2019, provisional application No. 62/743,485, filed on Oct. 9, 2018, provisional application No. 62/743,477, filed on Oct. 9, 2018, provisional application No. 62/743,483, filed on Oct. 9, 2018.

(56) References Cited

U.S. PATENT DOCUMENTS

| | | | |
|---|---|---|---|
| 9,395,262 B1 | 7/2016 | Kumar | |
| 2003/0171879 A1* | 9/2003 | Pittalwala | F17D 5/00 702/34 |
| 2007/0083398 A1 | 4/2007 | Ivey | |
| 2011/0137704 A1 | 6/2011 | Mitra | |
| 2012/0209653 A1 | 8/2012 | Andoji | |
| 2013/0138396 A1 | 5/2013 | Hauffen | |
| 2014/0052421 A1 | 2/2014 | Allen | |
| 2014/0110167 A1 | 4/2014 | Goebel | |
| 2015/0248737 A1 | 9/2015 | Forbes | |
| 2016/0103433 A1 | 4/2016 | Sahni | |
| 2023/0244836 A1* | 8/2023 | Veronesi | G06F 30/27 703/6 |

FOREIGN PATENT DOCUMENTS

| | | |
|---|---|---|
| CN | 105069694 | 11/2015 |
| JP | 2015094665 | 5/2018 |

OTHER PUBLICATIONS

Service Line Warranties of America "Average Cost of a Service Line Repair or Replacement" Blog [online]. Jun. 16, 2014 [retrieved Dec. 6, 2019]. Retrieved from the Internet: <URL: https://slwablog.com/2014/06/16/average-cost-of-a-service-line-repair-or-replacement/>.

Balkan, D "Calculating The Correct Water Supply Line Size For Your Home Or Property" 1-20 Article [online]. Sep. 22, 2014 [retrieved Dec. 6, 2019]. Retrieved from the Internet: <URL: http://www.balkanplumbing.com/required-main-water-supply-line-size/>.

Research for Establishment of Prediction of Pipeline Damage by Earthquake by Water Service Technology Center.

Written Submission of Publications.

\* cited by examiner

FIG. 6

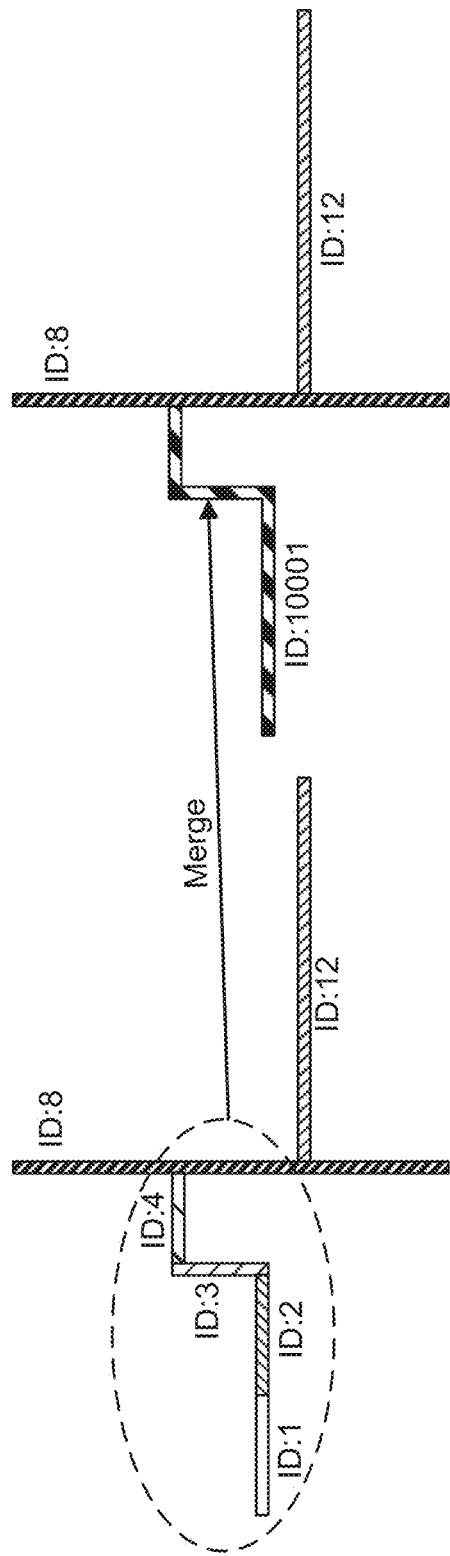

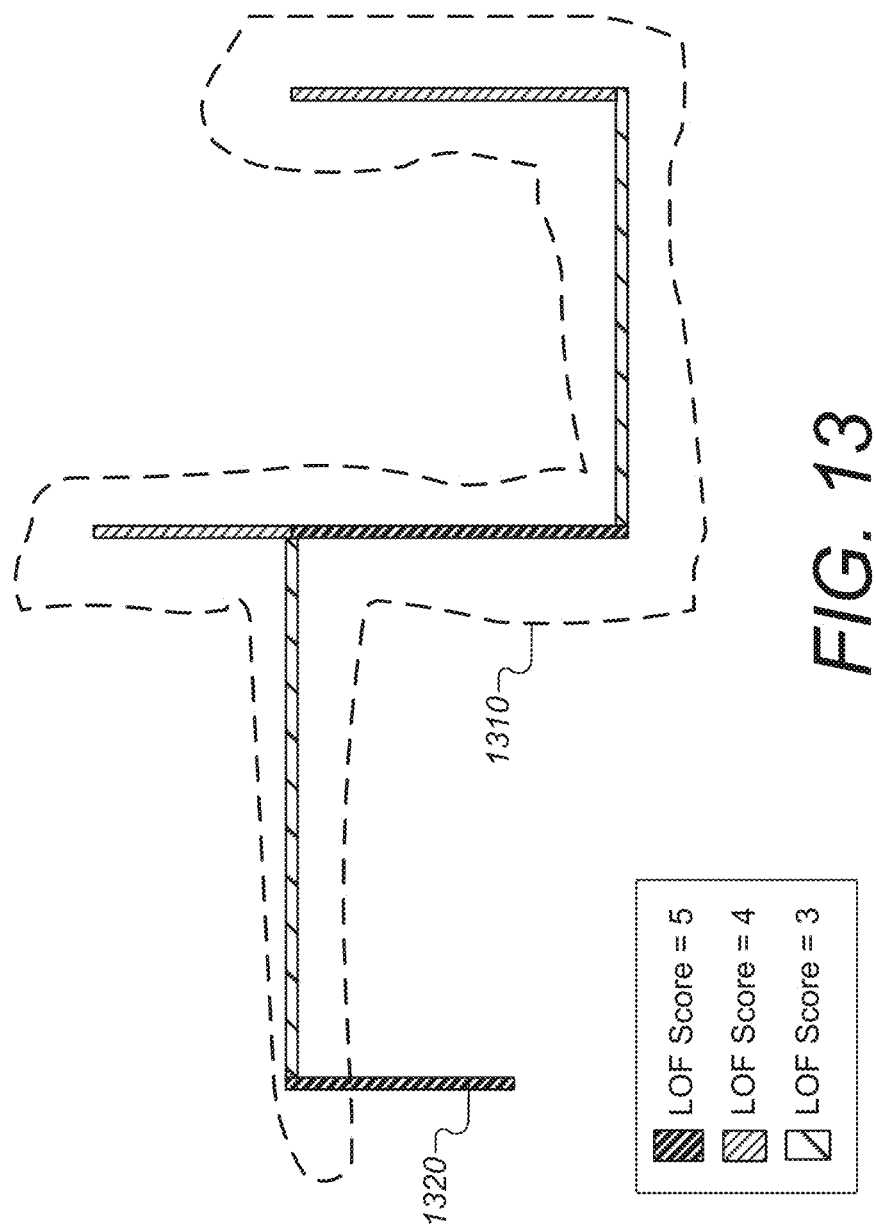

AUTOMATED ASSET MANAGEMENT AND PLANNING

REFERENCE TO RELATED APPLICATIONS

This application is a continuation-in-part of each of:
U.S. patent application Ser. No. 16/365,466 filed on Mar. 26, 2019;
U.S. patent application Ser. No. 16/365,522 filed on Mar. 26, 2019;
Int'l Pat. Appl. No. PCT/US19/24139 filed on Mar. 26, 2019; and
Int'l Pat. Appl. No. PCT/US19/24141 filed on Mar. 26, 2019.

This application incorporates by reference and claims the benefit of the filing date of each of the above-identified four patent applications, as well as of the applications that they incorporate by reference, directly or indirectly, and the benefit of which they claim, including U.S. provisional applications, U.S. non-provisional applications, and International applications.

This patent application claims the benefit of and incorporates by reference each of the following provisional applications:
U.S. Prov. Ser. No. 62/743,477 filed Oct. 9, 2018;
U.S. Prov. Ser. No. 62/743,483 filed Oct. 9, 2018;
U.S. Prov. Ser. No. 62/743,485 filed Oct. 9, 2018; and
U.S. Prov. Ser. No. 62/858,266 filed Jun. 6, 2019.

This patent application is related to and incorporates by reference the following U.S. Non Provisional, International Patent Applications and U.S. Provisional patent applications:
U.S. Prov. Ser. No. 62/649,058 filed Mar. 28, 2018;
U.S. Prov. Ser. No. 62/658,189 filed Apr. 16, 2018;
U.S. Prov. Ser. No. 62/671,601 filed May 15, 2018;
Int'l Pat. Appl. No. PCT/US19/55470 filed on Oct. 9, 2019;
U.S. patent application Ser. No. 16/597,691 filed on Oct. 9, 2019; and
Intl Pat. Appl. No. PCT/US19/55465 filed on Oct. 9, 2019.

All of the above-referenced provisional and non-provisional patent applications are collectively referenced herein as "the commonly assigned incorporated applications."

FIELD

This patent specification generally relates to automated systems and automated methods for asset management and planning. More particularly to automated systems and automated methods for asset management and planning repair and replacement jobs for networks of underground pipes carrying a fluid to consumers.

BACKGROUND

More than one million miles of water pipe in the United States alone are reaching the end of their useful life and are in need of replacement. Over the next 25 years, at least one trillion dollars will need to be invested in order to maintain the current level of service for a growing population. Ignoring the problem will lead to higher repair costs and increased service disruptions.

In the United States, the approximately 50,000 water utility companies do not have the resources to replace them all, due to limited budgets. Since all expired pipe cannot be replaced, it is vital that replacing pipes in the worst condition be prioritized while strategically leaving expired but healthy pipe to be replaced in the future.

The replacement plans that utility companies have created are fairly inaccurate and in many cases are not useful. The simplistic models that utility companies have created have led to the wasteful replacement of pipe that still would have had more years of life. Over the next twenty-five years, this would lead to millions of dollars of wasteful spending.

In coming up with a planned projects or jobs for replacing various segments of pipe, it is common for a utility company to assign a one to five "score" of some kind or a color code (e.g. five different colors) for each pipe segment according to some rating of failure risk (e.g. red being used for the highest risk of leaking). Pipe segments vary in length and construction projects have a range of minimum and maximum project size depending on various criteria (e.g. budgets, costs and availability of labor and equipment, other considerations such as governmental, social and environmental factors). Therefore, a job or project almost always includes replacing a number of connected pipes segments. Commonly, a human or team of humans will review the pipe segments having assigned scores or colors and to try to determine the best combinations of pipe segments that fit their project size goals. This method of "eye balling" and "pattern picking" manual review is not only painstakingly tedious, but can lead to inconsistent and inaccurate results.

SUMMARY

According to some embodiments, a method is described for planning projects for improving a network of interconnected managed assets. The method includes: receiving by a computer system a calculated risk of failure value for each of a plurality of the managed assets, the value being selected from a range that includes at least 10 different values; and searching through the plurality of assets and generating a plurality of potential improvement projects, each of the potential improvement projects including a plurality of the interconnected managed assets, wherein the generating of a potential improvement project is based at least in part on the risk of failure value of each of the managed assets included in the potential improvement project.

According to some embodiments, the risk of failure value includes a value representing likelihood of failure, and the value can be expressed as a probability of failure percentage. According to some embodiments, the risk of failure value can also include a value representing consequence of failure and/or business risk exposure.

According to some embodiments, the method can further include preprocessing. The preprocessing can include: merging shorter assets into longer assets; excluding groups of assets that are not worth searching; excluding assets having only a single interconnection and having low risk of failure value; and/or merging assets having similar risk of failure values.

According to some embodiments, the method can further include postprocessing to add to potential project(s) an additional connected managed asset. The adding can be based on the risk of failure value of the managed asset to be added and/or whether a combined risk of failure value for the potential improvement project is increased or decreased by adding the managed asset. The postprocessing can also merge two or more potential improvement projects into a single potential improvement project.

According to some embodiments, the interconnected managed assets are linear segments such as pipe segments and the potential improvement projects can be: pipe replacement projects, pipe rehabilitation projects, pipe inspection projects, leak detection project, and/or pipe condition assessment projects. The pipe segments can form a network for carrying water to consumers. According to some embodiments, the pipe segments are configured to carry fluid such as: fresh water; waste water; recycled water; brackish water; storm water; sea water; drinking water; steam; compressed air; oil; and/or natural gas.

According to some embodiments, the method can also include: displaying on a graphical user interface the plurality of potential improvement projects; and receiving selections of, or modifications to one or more of the potential improvement projects from the user.

According to some embodiments, the method can also include: displaying on a graphical user interface (e.g. map view and/or table view) potential improvement project plans each of which includes one or more potential improvement projects; and receiving instructions from the user relating to editing the project plans, comparing the project plans, merging the project plans and/or splitting the project plans. According to some embodiments, a system is described for planning projects for improving a network of interconnected assets. The system includes: a database that stores a calculated risk of failure value for each of a plurality of the managed assets, the value being selected from a range that includes at least 10 different values; and a processing system configured to automatically search through the plurality of assets and generate a plurality of potential improvement projects, each of the potential improvement projects including a plurality of the interconnected managed assets, wherein the generation of a potential improvement project is based at least in part on the risk of failure value of each of the managed assets included in the potential improvement project.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

BRIEF DESCRIPTION OF THE DRAWINGS

To further clarify the above and other advantages and features of the subject matter of this patent specification, specific examples of embodiments thereof are illustrated in the appended drawings. It should be appreciated that elements or components illustrated in one figure can be used in place of comparable or similar elements or components illustrated in another, and that these drawings depict only illustrative embodiments and are therefore not to be considered limiting of the scope of this patent specification or the appended claims. The subject matter hereof will be described and explained with additional specificity and detail through the use of the accompanying drawings in which:

FIG. 6 is a diagram illustrating a user interface displaying a more detailed view of a particular project in a project pool, according to some embodiments;

FIGS. 9A and 9B are diagrams illustrating merging shorter pipe segments to form a longer pipe segments in order to speed up a job planning searching process, according to some embodiments;

FIG. 13 is a diagram illustrating an example of a resulting project that is connected to pipe with high score.

DETAILED DESCRIPTION

Figure 1:
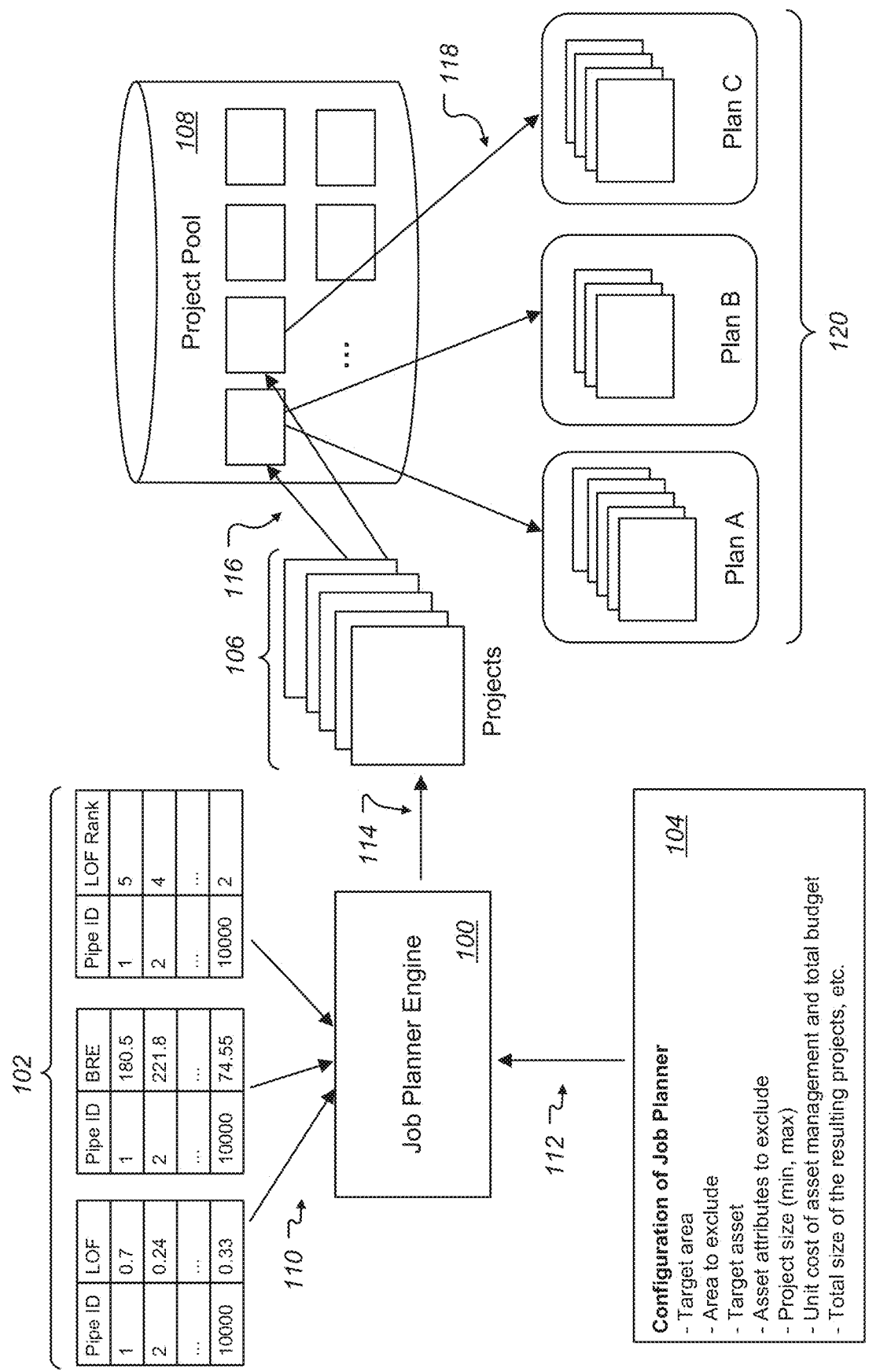
FIG. 1 is a conceptual diagram of job planner system, according to some embodiments.

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

According to some embodiments, job planning systems and methods by water utility companies are described. The job planning techniques can be used to efficiently create asset management plans and visualize their impact using information generated from their existing pipeline risk data. The job planner can serve as a central hub connecting risk information to mitigation action. In this way the job planner can leverage state-of-the-art risk information such as likelihood of failure (LOF) and business risk exposure (BRE) analysis. For further information on calculating LOF, see co-pending U.S. patent application Ser. No. 16/365,466 and Int'l Pat. Appl. No. PCT/US19/24139, both filed on Mar. 26, 2019, both referred to hereinafter as the "co-pending LOF applications", and both incorporated by reference herein. The described job planner techniques can be used to remove inconsistency from "eye balling" and "pattern picking" through painstaking manually reviewing screen over a graphic information system (GIS) and streamline workflow of pipeline risk management. For further information on calculating COF, see co-pending U.S. patent application Ser. No. 16/597,691 filed on Oct. 9, 2019 (Attorney Docket No. Fracta-009-US); and Int'l Pat. Appl. No. PCT/US19/55465 filed on Oct. 9, 2019 (Attorney Docket No. Fracta-009-PCT), both referred to hereinafter as the "co-pending COF applications", and both incorporated by reference herein. The described job planner techniques can "package" risk-based projects at preferable sizes with minimal effort from water utility company personnel. These projects can be used as either end point guideline for pipeline replacement or an entry point for targeted physical condition assessment, seamlessly integrating with water utilities existing risk management mitigation measures and strategy.

Each utility has unique challenges and methods of selecting projects for their asset management plan. Accordingly, adopting a goal-oriented workflow, the described job planning system and methods can enable water utility planners to quickly generate projects that cover high risk water mains to fit their specific needs.

The described job planning system and methods can: optimize main replacement projects that are reasonably sized for a variety of works; identify mains requiring upsize around new development projects; coordinate with upcoming paving plans for synchronized main replacement; and specify main materials to be phased out.

As used herein the following terms have the following meanings: "LOF:—likelihood or probability of failure of target asset (percentage or score is used in most cases, but estimated number of failure or failure ratio may be used as alternative); "COF"—consequence of failure of target asset (score or monetary value like dollar amount may be used); "BRE"—business risk exposure, derived from LOF and COF, usually defined as LOF×COF (the resulting value may be score, monetary value, etc.); "project"—a set of multiple assets to manage, "job" and "project" are used interchangeably herein; "job planner"—tool to generate project(s) automatically based on some values, such as LOF, BRE, etc., associated with each asset; "GIS"—geographic information system; "Plan"—a set of multiple projects; LOF/COF/BRE "rank"—rank of cohorts assigned by sorted LOF/COF/BRE, size of each cohort may not be the same; "asset linkages"—geographical linkages of multiple assets; "searching space"—a set of assets considered by the job planner (if the searching space is large than the job planner will take a relatively long time to generate project(s), and vice versa); and "score"—means values such as LOF, COF, BRE and the like.

FIG. 1 is a conceptual diagram of job planner system, according to some embodiments. In step 110, asset data associated with some score(s) to evaluate are imported into the job planner engine 100. Examples of asset data 102 shown are LOF, BRE and LOF rank for a number of pipe segments. In step 112 the Job Planner Engine is configured (with some example configuration parameters 104 shown) and the Job Planner Engine is "run." In step 114 the resulting projects 106 are obtained. In step 116 the projects 106 are added (if desired) to the project pool 108. In step 118, plans are created and/or edited by adding and/or moving project(s) from/to the project pool. Shown are example plans 120.

According to some embodiments, the user can edit the generated projects manually. For example, the user can add and/or remove a pipe segment(s) to/from a project. The user can sort and filter projects by size or other attribute in the project pool. For example, the user can sort projects by size and/or extract projects that contain pipes made of cast iron. The user can download projects and plans in various formats including csv, shapefile or an equivalent format such as gpkg.

Figure 2:
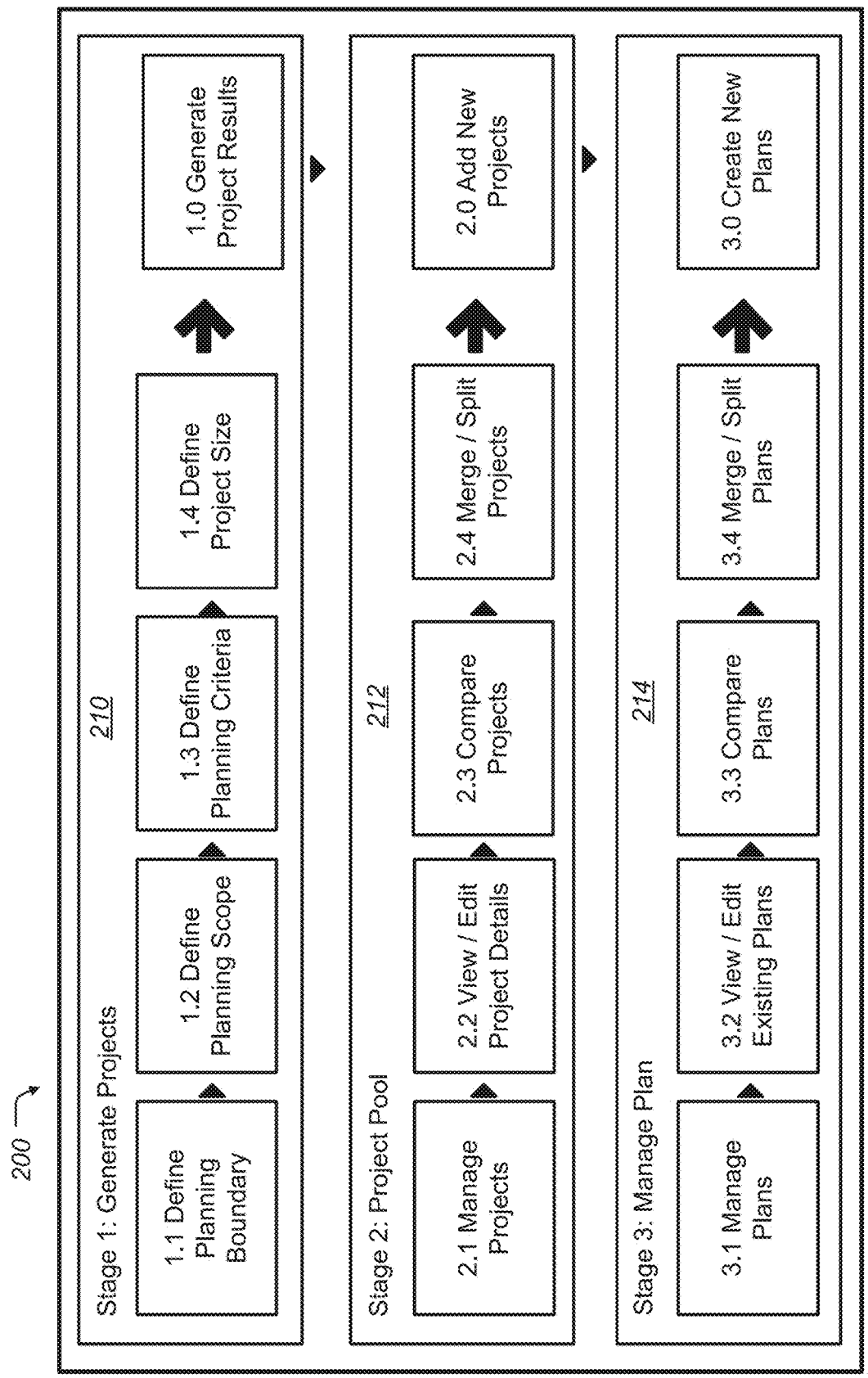
FIG. 2 is a diagram illustrating some of the functions and workflow of a job planner platform, according to some embodiments.

FIG. 2 is a diagram illustrating some of the functions and workflow of a job planner platform, according to some embodiments. The workflow of the job planner can be described in three major stages:

Stage 1—Generate Projects (210): Creating individual projects based on the utility's risk management objective. Specific steps in this stage are also included in diagram 200. This stage allows users to create projects that are the right size for their utility, in order to tackle the potential business risks more efficiently and effectively.

State 2—View Project Pool (212): This stage enables user to manage a collection of projects before they are selected for specific asset management plans. Specific functions in this stage are also included in diagram 200. Being the project repository, this stage provides a "parking" site for project candidates as well as allowing potential refinement of individual projects before user move on to the next stage.

Stage 3—Manage Plan (214): The highest level of job planner stages, this stage allows users to create individual asset management plans tailored to specific goals. Specific functions in this stage are also included in diagram 200. This stage provides the most flexibility in levels of analysis and control, allowing the user to manage multiple plans, different risk management goals at the same time, without losing site of the overall picture of the utility and detailed information from each project.

The following sections provide further detail for functions offered in each stage within a job planner, according to some embodiments.

Stage 1—Generate Projects.

This first stage is a foundation of a job planner. As a bottom layer, it serves as the landing page for new user of a job planner to generate projects and populate an empty project pool.

Figure 3:
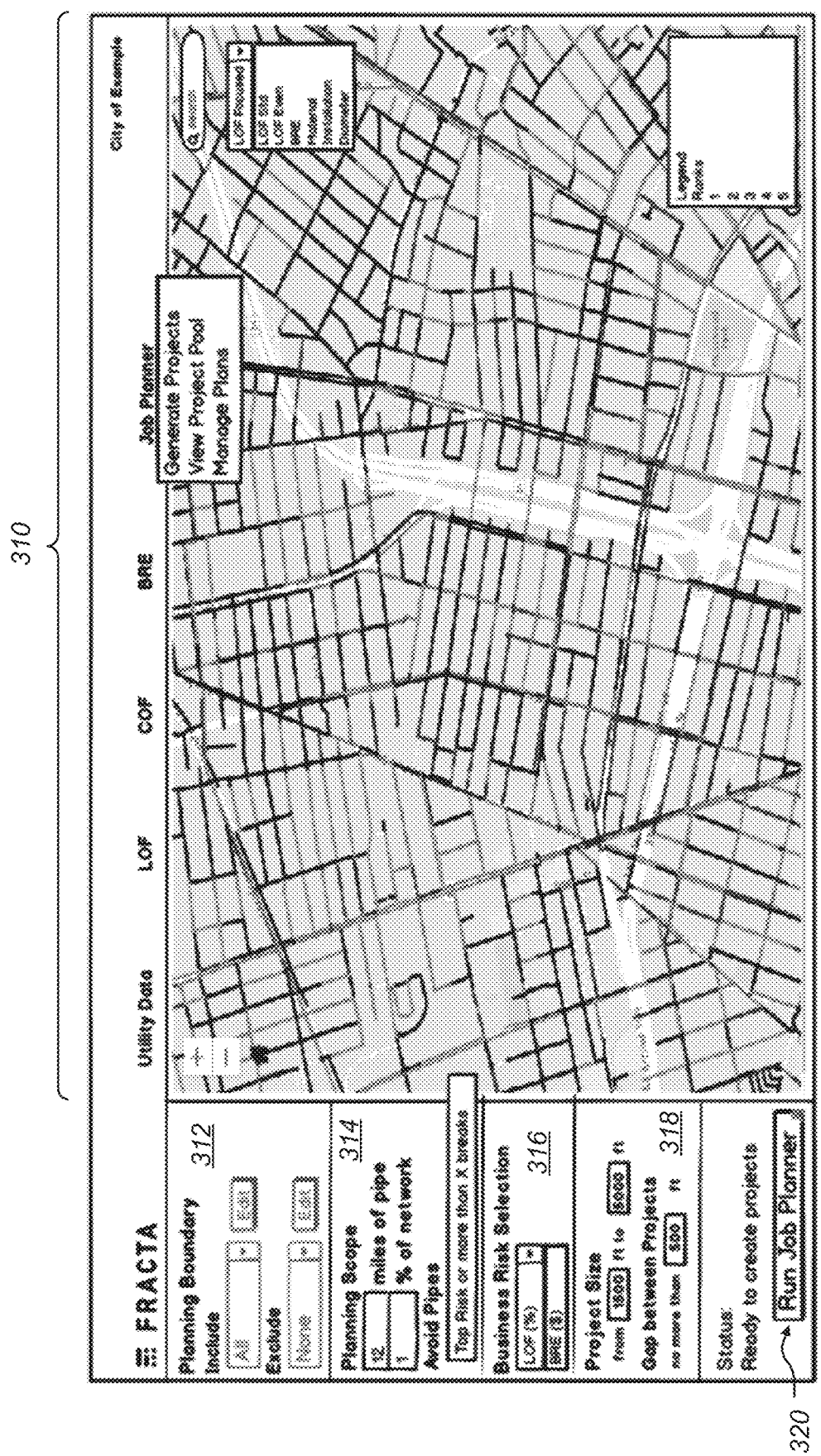
FIG. 3 is diagram illustrating aspects of a user interface in a first project generation stage of a job planner, according to some embodiments.

FIG. 3 is diagram illustrating aspects of a user interface in a first project generation stage of a job planner, according to some embodiments. This stage allows user to define their projects with minimum input that is relevant to the utilities' specific objectives. The map section 310 of the interface shows relevant risk information and pipe information based on user's preference, including LOF, COF, BRE and pipe attributes data. According to some embodiments, colors such as red, orange, yellow, light blue and dark blue, can be used to denote five different levels of risk information for the various pipe segments in map section 310. According to some embodiments, the color coding can be assigned according a percentage of pipe length. One example is as follows: 3% of the pipe length having highest LOF is colored red; between 3%-10% of the pipe length having the next higher LOF is colored orange; between 10%-25% of the pipe length having the next higher LOF is colored yellow; between 25%-50% of the pipe length having the next higher LOF is light blue; and the 50% of the pipe length having the lowest LOF is colored dark blue.

According to some embodiments, there are four steps for utility planners to generate a new set of projects that can be added to their growing project pool: (1) Define Planning Boundary; (2) Define Planning Scope; (3) Define Planning Criteria; and (4) Define Project Size.

Step 1: Define Planning Boundary.

In section 312 utility planners can define the planning boundary through a drawing tool, or upload GIS information stored locally/online. The resulting planning boundary can be stored on the provider's server by its name, allowing the user to reuse it in the future if desired. According to some embodiments, users can also upload GIS information and identify areas to be either included or excluded for generating projects. For example, user may want to upload GIS information for: future street paving projects to be prioritized for pipe replacement or rehabilitation candidate areas; current street paving projects already completed for moratorium periods that will not allow pipeline projects for at least 5 years; and/or new development areas that require focused pipeline replacement/upgrades based on risk mitigation consideration. According to some embodiments, custom risk profile(s) can be uploaded by the user.

Step 2: Define Planning Scope.

In section 314, the user specifies a target amount of pipeline to be included for analysis. The pipeline planner at water utility could either choose to specify the pipeline scope by total length of pipe to be included in the analysis or using a percentage of the total network instead. The two fields are linked to each other so that as user make changes any one of the two fields, he/she will get an idea what it means both in terms of total length and proportion of the whole network.

Step 3: Define Planning Criteria.

According to some embodiments, in section 316 customers can to take advantage of the LOF and BRE information generated through an existing machine learning algorithm. For further detail in calculating and providing for customer utility companies, see co-pending LOF application. If the user would prefer focus on the likelihood of failure for their pipeline, LOF can be used as the project selection criteria. Alternatively, if the user prefers to use monetized business risk exposure to account for the criticality of their pipe segments, then BRE information can be selected instead.

According to some embodiments, the user can take advantage of their own versions of risk analysis if desirable. In such cases, the user can upload a shapefile or table containing custom risk criteria that can be linked to the cleaned pipe network and select custom risk criteria to generate projects.

Step 4: Define Project Size.

Public utilities sometimes contract out their pipeline work to third party construction contractors with specific project sizes in mind. In order to maximize the incentive to attract more bidding teams, the projects need to be neither too small nor too large. The "mini" projects that are too small are not optimal for contractors to bid because it cannot cover the cost of crew and equipment mobilization. On the contrary, if project sizes are too long, it can lead to concentrated risk by limiting the number of contractors working with the utility. Therefore, it is important for utilities to be able to select the optimal size projects for business risk reduction.

In section 318, the user can define both the minimum and maximum length of pipeline projects. In addition, maximum gap can be defined by utility if they choose to merge adjacent projects. This merging functionality can also be achieved in later stages in the future.

Generate Projects Result.

Figure 4:
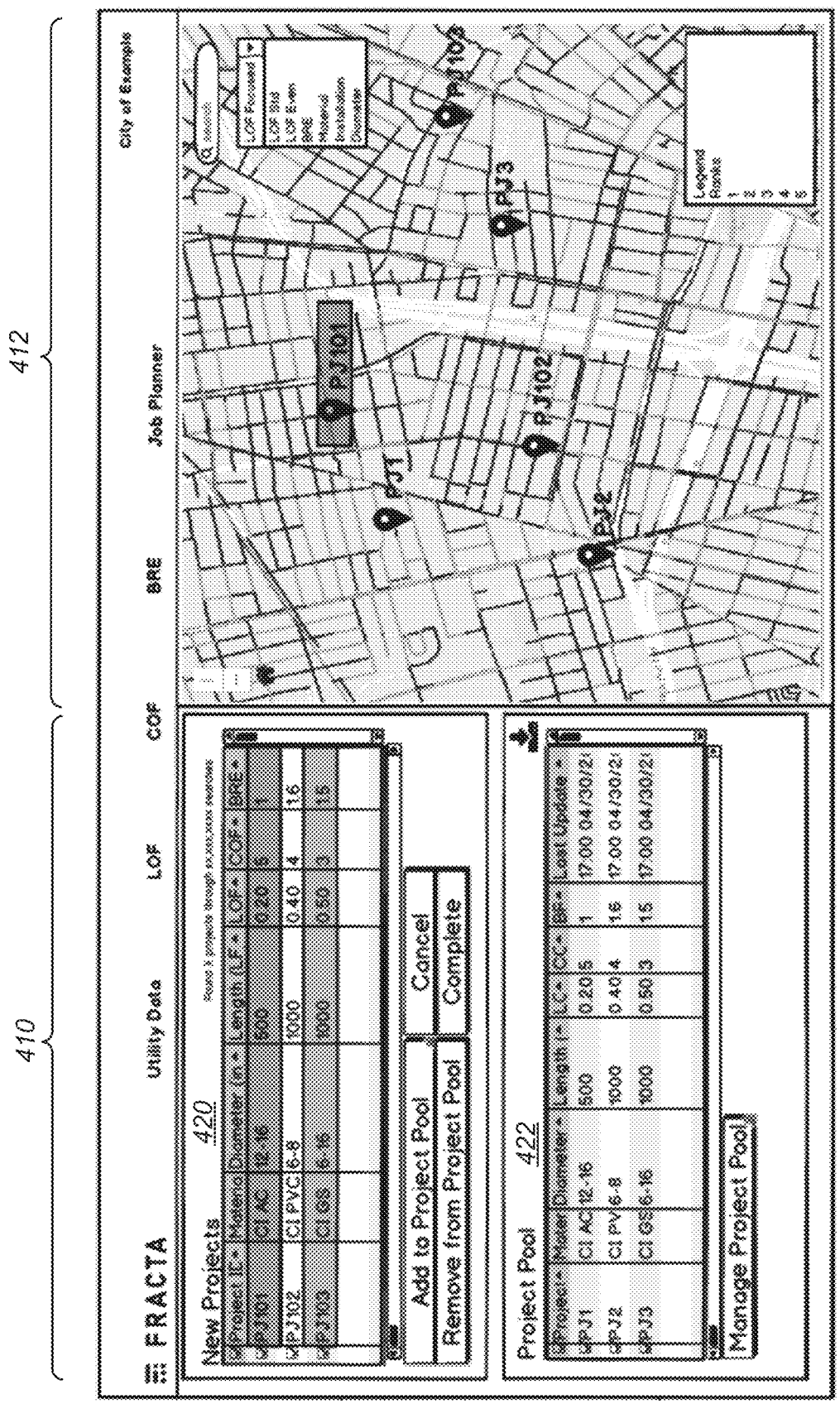
FIG. 4 is a diagram illustrating a user interface displaying the generation of project results by a job planner, according to some embodiments.

As the planner completes the above 4 steps in Stage 1, he/she will be able to click the "Run Job Planner" button 320 in the end and see results (new projects), as shown in FIG. 4. The results page of Stage 1 serves as a bridge between State 1 and Stage 2.

FIG. 4 is a diagram illustrating a user interface displaying the generation of project results by a job planner, according to some embodiments. The new projects generated through Stage 1 are shown in both table section 410 and map section 412. The background of the map section 412 can display different risk criteria as defined by user, such as LOF, COF, BRE or pipe attributes, to provide an anchor point for user analysis/evaluation of the resulting projects. According to some embodiments, as in map section 310 of FIG. 3, colors such as red, orange, yellow, light blue and dark blue, can be used to denote five different levels of or risk information.

The user can select the new projects from the results and add them to the project pool, either from the table in section 420 or from the map section 412. The table section 420 can be automatically highlighted when the user makes a selection on map section 412 and vice versa. In the example shown. The project "PJ101" is selected by the user (e.g. using mouse click) and the entry for PJ101 on both the table section 420 and the PJ101 marker on the map section 412 are highlighted, for example, with a yellow color.

If a particular user has used the job planner platform in the past, the project pool can display existing projects both in the table section 422 and on the map section 412. According to some embodiments, different colors and/or symbols can be used to distinguish new projects from existing projects. When freshly generate projects are added to the project pool, they will be marked using a different color and/or marker, so that user can easily identify them as new members in the project pool. This way, if the user later decides to remove such projects from the pool, it is easy to select them during this process.

Finally, the user can cancel or save the changes before leaving Stage 1 and going into other stages within Job Planner. The existing project pool can be downloaded to user's local computer for further analysis and refinement. According to some embodiments, the user can upload any type of GIS shapefile for boundary delineation.

Stage 2—View Project Pool.

This stage is where utility planner manages potential project candidates for their asset management plan. The main functionalities in this stage include: manage projects; view and/or edit project details; compare projects; and merge/split projects. Adding new projects to project pool is the starting point of a new user using job planner. This function is realized through Stage 1, which contains a direct linkage to Stage 2 at the completion of Stage 1 as described supra.

Figure 5:
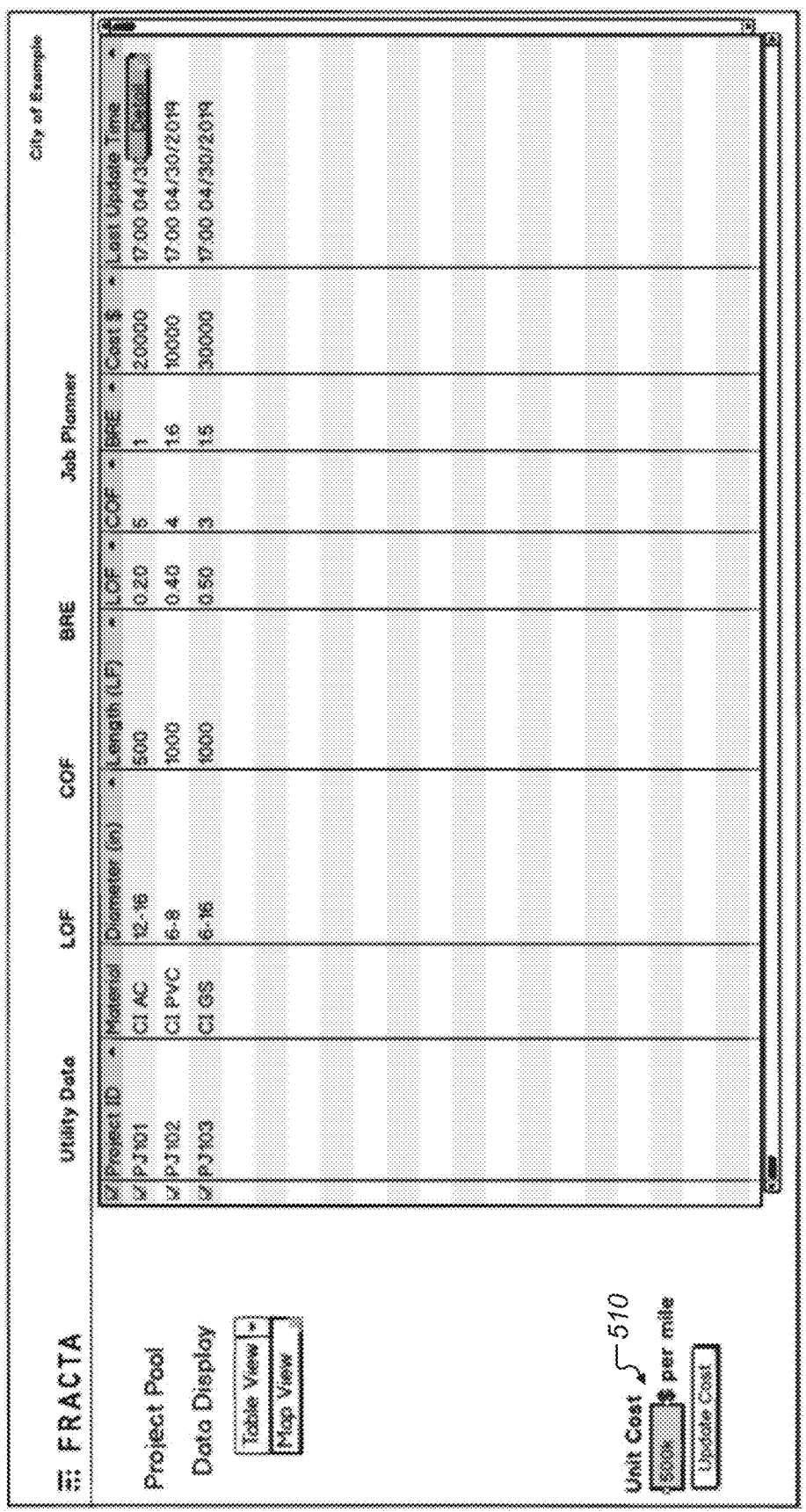
FIG. 5 is a diagram illustrating a user interface displaying a table view of a project pool, according to some embodiments.

FIG. 5 is a diagram illustrating a user interface displaying a table view of a project pool, according to some embodiments.

Manage Projects.

Projects can be managed in through table view and map view. Under table view, shown in FIG. 5, a summary of the project is provided in rows, including the project ID, pipe material, diameter and lengths, as well as risks associated with the projects. Under a map view (not shown), the relative locations of all the projects within the project pool can be reviewed and inspected by user. Like the map view in stage 1, user can choose the backgrounds from various risk factors to pipe attributes as anchor points when evaluating the validity of these project candidates. Users can also click on individual projects in the map to see detailed information that's contained in the table view above.

Although some examples have been described in the context of project in which the pipe segment would be replaced, according to some embodiments other types improvement projects can be included in the job planner platform. Examples of other types of projects that can be included in the job planner include, without limitation: pipe rehabilitation, pipe inspection, leak detection, and pipe condition assessment. In general, any intrusive or non-intrusive field work related to pipe asset management can form a project or part of a project. In the input section 510 of FIG. 5, the "unit cost" of the project can set by the user. This unit cost should be entered by the user depending on the expected cost for the type of project. The unit cost can also be entered or adjusted in screens in FIGS. 7 and 8.

Figure 6:
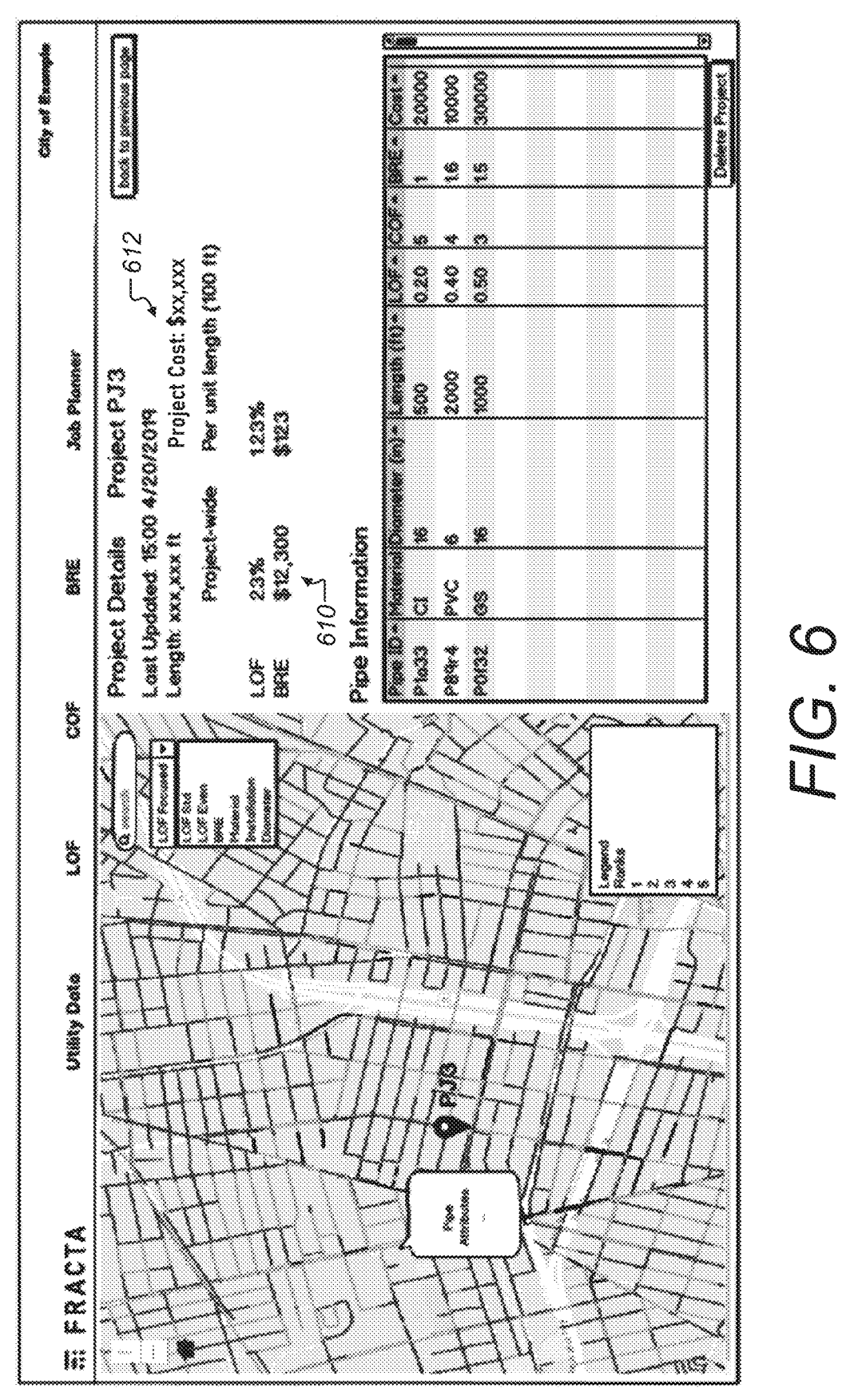

FIG. 6 is a diagram illustrating a user interface displaying a more detailed view of a particular project in a project pool, according to some embodiments.

View/Edit Project Details.

Users can have the opportunity to go a level deeper into the project details and inspect more information associated with a single project at pipe segment level. FIG. 6 shows a sample user interface of such a "project details" view. In addition to the project level information displayed in the project pool table and map view, the project details functionality allows users to inspect individual pipe segments within the candidate project. The pipe attribute information and risk parameters from project level can be evaluated separately for each pipe segment, so that user can have a clear idea how each segment contributes to the project cost and system risk reduction.

According to some embodiments a user can make specific changes to the project at the user's discretion, independent from pure risk analysis. During typical planning, specific project selection is not only tied to risk factors alone. Therefore, allowing user to edit specific projects by adding/removing certain sections of pipe provides necessary flexibility to create better, more practical projects.

Compare Projects.

Through either the project pool view or the project details view, users can open multiple windows to compare parameters of multiple projects. This functionality can also be provided in a single window.

Merge/Split Projects.

As mentioned in Stage 1, users are allowed to merge projects together based on their distance or split projects apart based on practical reasons.

According to some embodiments, the project pool and project summary information can be downloaded to user's local computer for further analysis and refinement. According to some embodiments, users can sort and filter projects within the pool by pipe attributes (material, age, diameter and etc.) and risk characters (LOF, COF, BRE), making it more convenient for user to identify projects that are targeting a specific asset management goal.

Stage 3 Manage Plans.

This stage is where utility planners can create, manage and modify their asset management plans aimed for business risk reduction and mitigation. The functionalities in this stage include: managing plans; viewing and editing plans; comparing plans; and merging/splitting plans. New users to Job Planner will need to create their first asset management plan by selecting projects from the project pool. Existing users who already has multiple plans in the system could also create plans by copying from an existing plan.

According to some embodiments, the user can easily compare the business risk exposure 610 with the project cost 612 on the interface shown in FIG. 6 to make sure that the project makes sense. Note that the project cost 612 is closely related to unit cost that can be entered or modified by the user in section 510 of FIGS. 5, 7 and 8.

Figure 7:
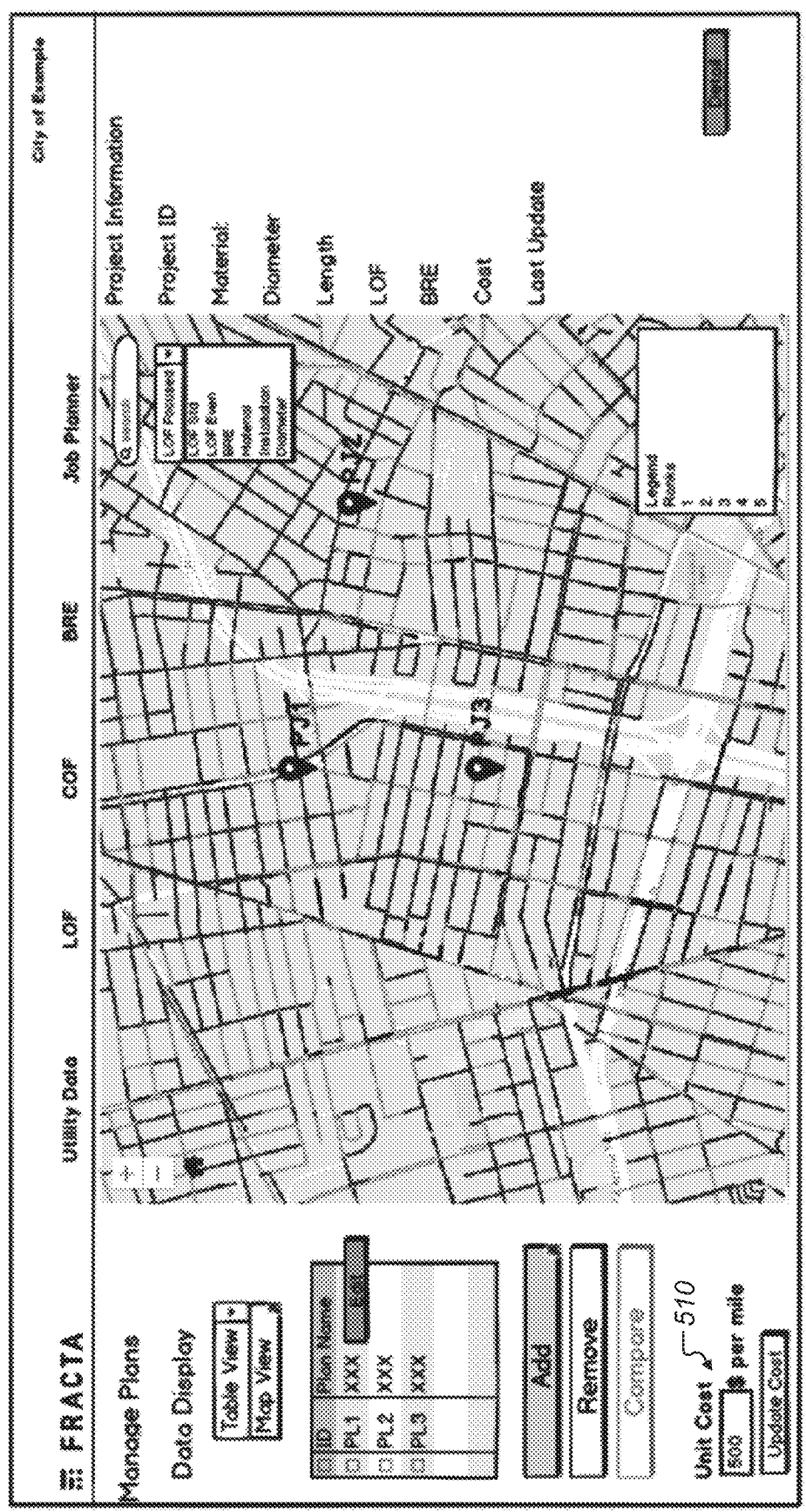
FIG. 7 is a diagram illustrating a user interface displaying a map view for managing plans, according to some embodiments.
Figure 8:
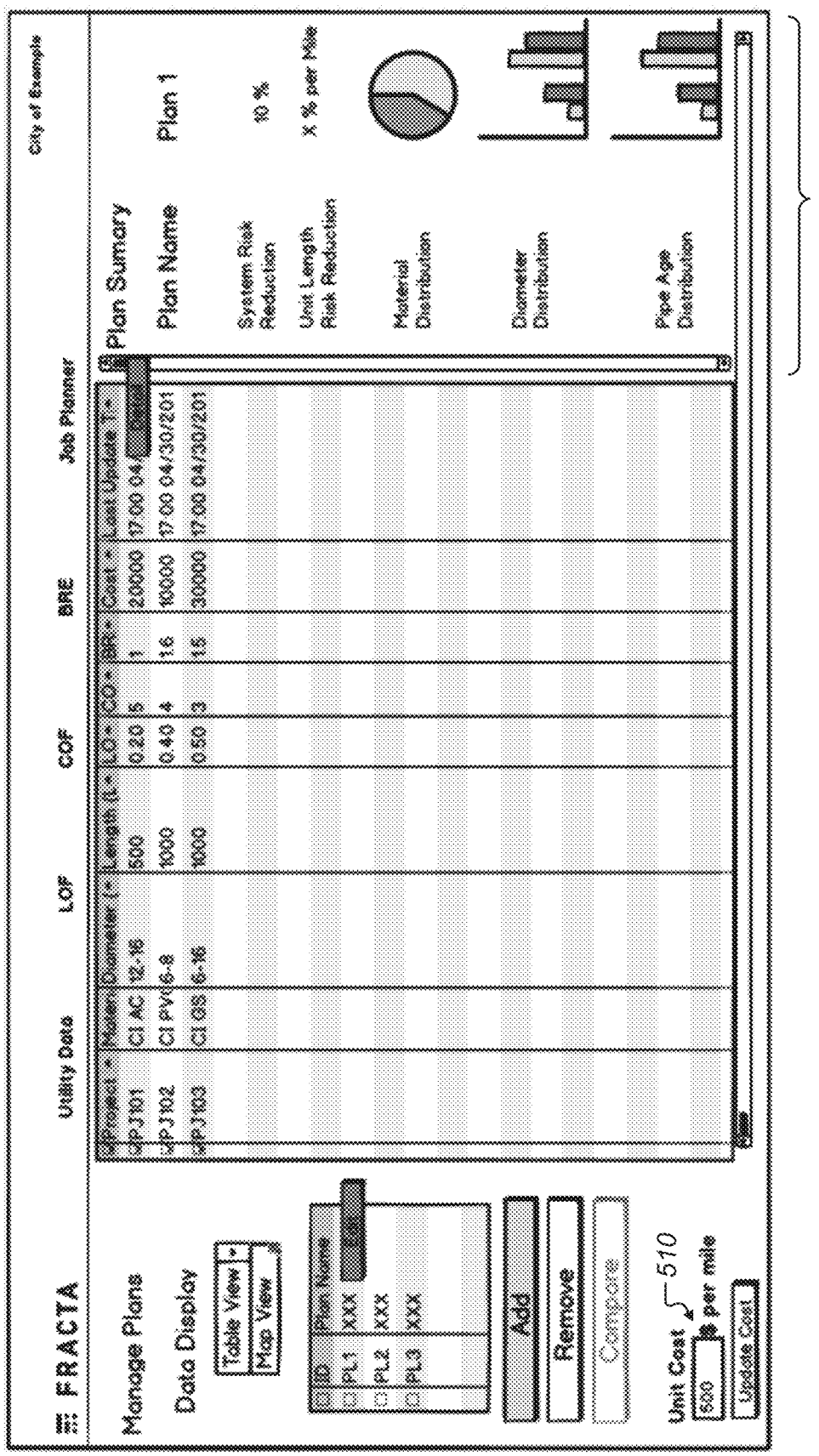
FIG. 8 is a diagram illustrating a user interface displaying a table view for managing, according to some embodiments.

FIG. 7 is a diagram illustrating a user interface displaying a map view for managing plans, according to some embodiments. FIG. 8 is a diagram illustrating a user interface displaying a table view for managing, according to some embodiments.

Manage Plans.

Similarly to the management of the project pool, users can manage existing plans through either map view (e.g. FIG. 7) or table view (e.g. FIG. 8). Users can select one or multiple plans to be displayed on the map or in the table. On the map view (FIG. 7) users may select one project on the map to view specific information regarding that project. Projects that belong to different plans can be displayed in different colors and/or symbols.

Under the table view (FIG. 8), information can be provided similar to that provided in the project pool stage, such as project pipe attributes information and risk information. The manage plans stage (e.g. in section 810) can provide a summary of the established plan under table view. This summary gives user information to the utility, such as total risk reduction, risk reduction efficiency, project cost, and return on investment for decision makers.

In addition to the high-level overview, in section 810 a more detailed analysis on asset management plans can be provided, including the statistical distribution of water main material, age, and diameter. This can allow utility planners to gain control over the unique objective of their individual plans and improve existing plans as new information becomes available.

Project costs associated with water main projects are flexible due to different types of action, for example: replacement, rehabilitation, proactive leak detection, or other types of physical condition assessment. The manage plan stage allows user to update the project cost inside the platform to fit different activities. Comparing these with the monetized risk reduction measure will help utility planners make the best decisions to achieve the level-of-service goal at maximum efficiency in dollar and manpower.

View/Edit Plans.

Plans can be thought of as essentially different pools of projects that can be viewed and edited in the same way as viewing and editing a project pool. For any specific plan, the individual projects can be removed from the plan or added into the plan from either table view or map view.

Compare Plans.

The compare plan functionality puts information from multiple projects together so that users can identify similarities and differences across multiple plans based on the pipe composition, risk factors as well as project costs. Through comparison, utilities can decide on whether one plan can be used instead of another, or any improvements that could be made.

Merge/Split Plans.

Like the merge/split projects feature described supra, the merge/split plan functionality allows merging between multiple plans to fit the utility's needs, as well as splitting plans to allow a smaller number of projects within plans is also possible in future product functions.

Since each plan carries several projects together, like the project pool, some functionalities that are offered with in the project pool stage are shared with plan management stage. These include viewing/editing projects and merging/splitting projects, thereby providing increased flexibility for users to navigate their analysis from top to bottom levels. Plans and project summaries can be downloaded to user's local computer for further analysis and refinement.

Further detail of the searching algorithm will now given. In general the searching algorithm includes the following: (1) pre-processing to narrow the searching space; (2) running of the search engine; (3) post processing; and (4) generating planned projects. Following illustrates various aspects of how a job planner generates projects. A searching algorithm is described in the case where the target asset is water pipe, and the pipe connections are already calculated and known.

Preprocessing.

The purpose of preprocessing is primarily to narrow searching space to speed up the process. According to some embodiments the preprocessing can include the following: (1) merging short pipes into longer pipes; (2) excluding groups of pipes that are not worth searching; (3) excluding end-pipe segments having low score; and (4) merging pipes having similar scores.

FIGS. 9A and 9B are diagrams illustrating merging shorter pipe segments to form a longer pipe segments in order to speed up a job planning searching process, according to some embodiments. In the example shown, pipes whose pipe IDs are 1, 2, 3 and 4 are relatively short. Merging them they are replaced with single long pipe segment (pipe ID 100001). By this simplification, data of asset linkages are simplified (4 rows to 1 row). The searching space is therefore downsized. When merging pipes, pipe attributes such as material, install year, diameter may be considered. For example, the algorithm may choose to merge pipes only if all of attributes are almost the same or exactly the same. Note that the score for the new pipe segment should be re-calculated.

Further preprocessing can include finding and excluding groups of pipe segments that are not worth searching. If pipe segments are surrounded by pipe segments with very low scores, those pipe segments with or without surrounding pipe segments can be removed from searching space. A threshold can be pre-defined or dynamically calculated. As an example of dynamic thresholds include: "mean value of the score/4", "median value of the score/4", or the score of pipe located at lowest N %.

Another preprocessing technique can include dropping pipe segments having a low score, if not connected to multiple pipes. In other word, if the pipe is end of the pipe network and has a relatively low score, then the pipe segment can be excluded. According to some embodiments, a pre-defined threshold of the score, or dynamically calculated threshold of the score can be used. As described, supra, examples include: "mean value of the score/4", "median value of the score/4", or the score of pipe located at lowest N %.

Another preprocessing technique can include merging pipes with other pipes having similar scores. For example, pipe A has LOF=0.01, and pipe B has LOF=0.0102. If the threshold is 0.001 and pipe A and pipe B are connected, then these pipes can be virtually merged and taken as single pipe segment. However, if pipe A has LOF=0.01, and pipe B has LOF=0.02, then these are not merged because difference of the score is greater than the predefined threshold. Again, the threshold can be a pre-defined fixed value, or dynamically calculated. An example of a dynamically calculate threshold follows: (1) sort all pipes by their scores; (2) calculate the differences between immediate adjacent pipes (e.g. calculate the difference of $1^{st}$ and $2^{nd}$, $2^{nd}$ and $3^{rd}$, $3^{rd}$ and $4^{th}$, . . . ; (3) calculate the mean value of the differences; and (4) set the threshold to the mean value/N. Similarly to merging of short pipes preprocess described supra, pipe attributes may be considered when merging, and score of the merged pipe should be re-calculated.

LOF and BRE are often used for asset condition assessment and job planning. But this information may not be sufficient for effective asset management (e.g. determining which pipes to replace). For example, pipes may be ranked with a number from 1 to 5, with "5" representing the highest LOF, and "1" representing the lowest LOF. A single Rank 5 segment, which has a high probability of breaking, can be found surrounded by Rank 1 pipes, which have a low probability of breaking. Most water utilities do not replace single segments, rather they replace entire areas or blocks of pipe. In order to help utilities with asset management, computational searching algorithm to find asset groups with high combined score, such as LOF, BRE, etc., has been found to be highly useful.

Figure 10A:
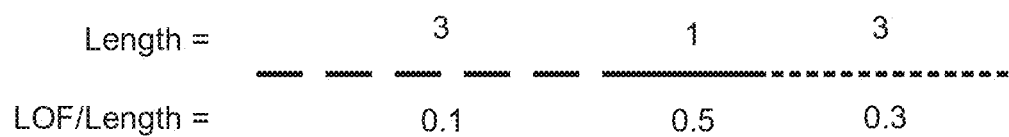
FIGS. 10A to 10C show three different possible pipe replacement jobs under consideration, according to some embodiments.
Figure 10B:
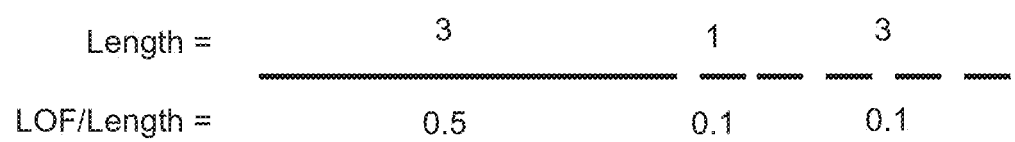
Figure 10C:
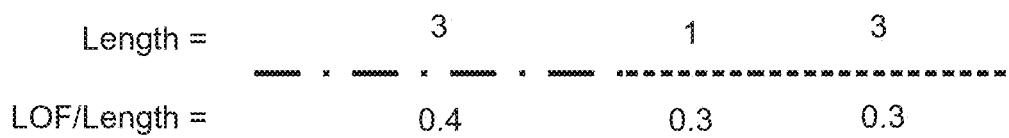

FIGS. 10A to 10C show three different possible pipe replacement jobs under consideration, according to some embodiments. $1-\Pi(1-P_{si})$ is the probability that one pipe breaks; $\Pi(1-P_{si})=(1-P_{si})(1-P_{si})\ldots(1-P_{si})$ is the probability that no pipes break; and $P_{si}=1-(1-P_{Li})^{li}$ is the LOF/Segment of $i^{th}$ pipe; $P_{Li}$ is the LOF/Length of the $i^{th}$ pipe segment; and li is the length of the $i^{th}$ pipe segment. In FIG. 10A, the LOF/Construction is 0.87; in FIG. 10B, the LOF/Construction is 0.92; and in FIG. 13C the LOF/Construction is 0.95. In this example, the job of FIG. 10C will be the highest priority job of the three.

Figure 11A:
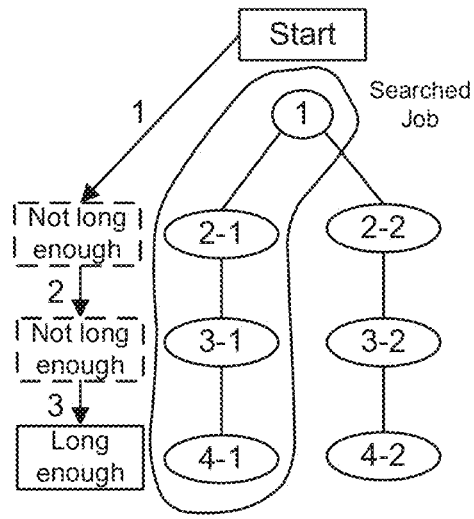
FIGS. 11A-11C are diagrams illustrating aspects of a scheme for a searching algorithm for job planning, according to some embodiments.
Figure 11B:
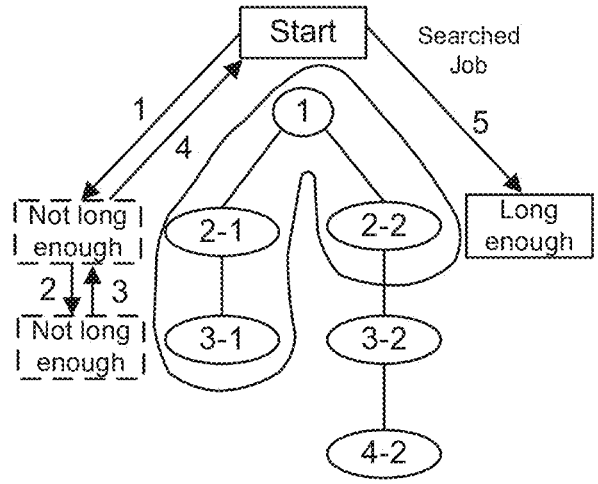
Figure 11C:
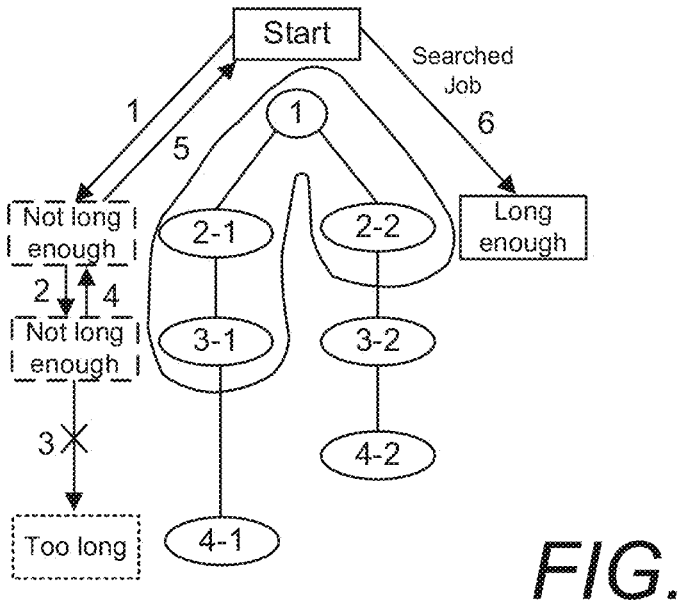

FIGS. 11A-11C are diagrams illustrating aspects of a scheme for a searching algorithm for job planning, according to some embodiments. The job planner searching engine scans all, or subset of combinations of pipes. In FIG. 11A, the engine starts from each pipe segment (e.g. "1") and searches all, or subset of each linked pipe segment recursively. The process continues until project length gets longer than a predetermined threshold (in FIG. 11A after adding the third segment "4-1" the proposed project is "Long enough"). FIG. 11B shows a case where initially the result of a current branch is not long enough (adding segment "3-1" the project is "not long enough." In this case the job planner engine searches another branch (adding "2-2") and repeats the process. FIG. 11C shows a case where a pipe segment ("4-1") to add is longer than the threshold ("too long"), the pipe segment is discarded and job planner goes to the other branches.

Also, the job planner engine may stop searching based on other criteria. While searching, job planner engine recursively calculates a project-wise score(s) every time a pipe segment is added to the project being processed. Examples of the "score" include: LOF [%], LOF score, BRE [$], BRE score, LOF Rank, and BRE Rank, although other metrics can be used. Depending on score metric used, a project-wise score may be calculated differently.

For example, when using LOF [%], Job Planner may use the following equation:

$$LOF/\text{Project} = 1 - \prod_{i=1}^{N}(1 - LOF_i/Seg)$$

where N is the number of pipes contained in the project, and $LOF_i$ is LOF of i-th pipe segment in the project. For another example, when using BRE score, Job Planner may use the following equation:

$$BRE/\text{Project} = \sum_{i=1}^{N} BRE_i$$

where N is the number of pipes contained in the project, and $BRE_i$ is BRE of i-th pipe segment in the project. As mentioned above, used score and equation to calculate project-wise score should be flexible, and may be customized by user.

Caching Algorithm.

The computational time of a job planner engine can be very long because of its relatively large searching space. Preprocessing to reduce searching space may be used, as described supra. According to some embodiments, a cache system can be used to reduce computational time. In short, cache system reuses previously calculated results.

Figure 12A:
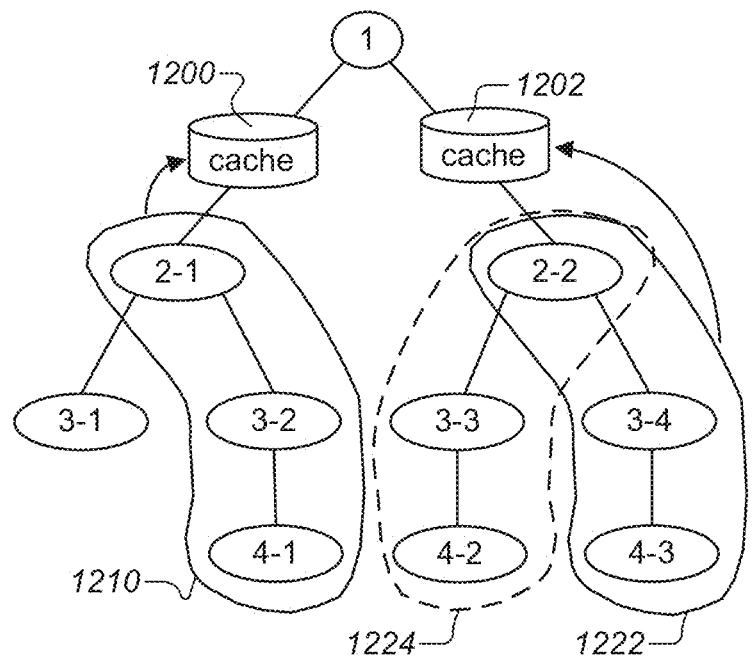
FIGS. 12A and 12B are diagrams illustrating aspects of a caching algorithm for a job planning engine, according to some embodiments.
Figure 12B:
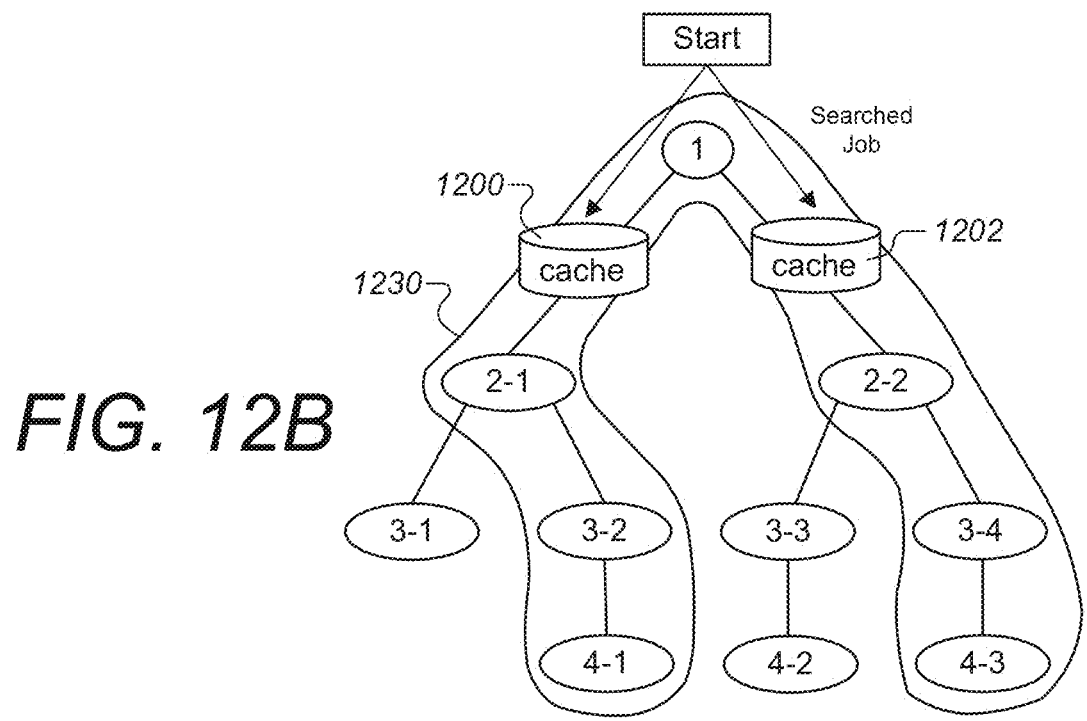

FIGS. 12A and 12B are diagrams illustrating aspects of a caching algorithm for a job planning engine, according to some embodiments. Each link has a cache container and caches the previous result of searching. The container will cache the data as follows. The longest sub-project following to the link, if the other following sub-projects are shorter or longer than some threshold(s). In FIG. 12A, the sub-project 1210 is cached in cache container 1200. If there are more than sub project that meets the threshold criteria, then "the best sub-project" is cached. The "best" may be the sub-project with the highest LOF/Sub-Project, for example. In FIG. 12A there are two sub-projects 1222 and 1224 that meet the threshold criteria. Sub-project 1222 is deemed better than sub-project 1224 by some criteria (e.g. highest LOF) and therefore sub-project 1222 is stored in cache container 1202. In FIG. 12B, a subsequent search is being made for pipe segment "1". As indicated by the "start" box the two cache containers 1200 and 1202 are accessed and the project 1230 is generated quickly from the previously cached sub-projects.

Post Processing.

The purpose of post processing is generally to make sub-optimal results closer to global optimal results. Searching all of possible combinations is impractical. Accordingly the searching space should be somehow narrowed (as described supra with respect to preprocessing). Further, the searching algorithm can be designed to do a completely thorough search (e.g. to stop searching in a given direction in favor of a new direction when several pipe segments with low scores in a row are detected in the given direction). Accordingly, it can said that the searching algorithm approximately searches the best projects.

As a result, a common output from a job planner search are "local optimal(sub-optimal)" results, not "global optimal" results. Because of the sub-optimal results, sometimes the job planner outputs counter intuitive results.

Following are two examples of such a result. In a first example, the resulting project is connected to pipe with high score. In a second example, the resulting project is next to other resulting project(s). A reason why such results can occur is that the job planner has decided to stop searching or change direction before adding the pipe within sequential complicated computations accidentally.

FIG. 13 is a diagram illustrating an example of a resulting project that is connected to pipe with high score. The resulting project 1310 is connected to a pipe segment 1320 that has a high score (LOF score=5). It can be seen that the job planner found a sub-optimal project since it finished searching due to time constraints. Clearly the pipe 1320 with high LOF next to the project 1310 can be a merged planned project. So as to avoid missing such pipe(s), the job planner can be configured to check for such pipes and to add them to the project if found. According to some embodiments, the job planner can use two types of criteria when deciding whether to add a pipe or not. It will check one or both of the following: (1) whether the pipe's score is greater than a threshold, which is pre-defined or dynamically calculated; and (2) whether a normalized score (normalized with respect to project size, such as LOF/Len of project) of the project doesn't decrease by adding the pipe.

Figure 14:
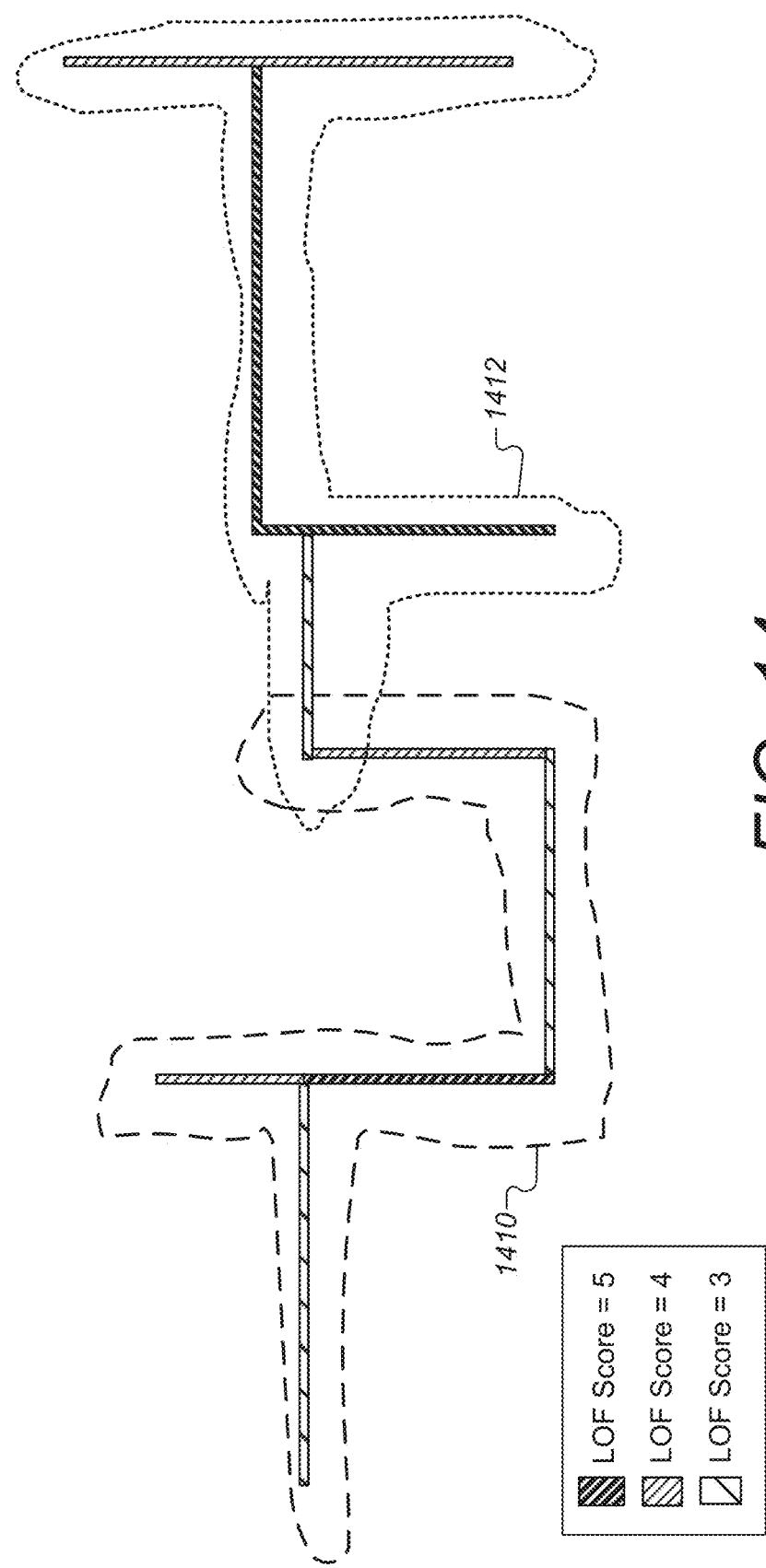
FIG. 14 is a diagram illustrating an example of a resulting project that is next to other resulting project(s).

FIG. 14 is a diagram illustrating an example of a resulting project that is next to other resulting project(s). In this the resulting project 1410 is connected to another resulting project 1412. According to some embodiments, this can be resolved by automatically merging the two projects 1410 and 1412, provided that the total length of the merged project is not greater than allowed maximum size that the user has configured.

According to some embodiments, the three steps (step 1—preprocessing, step 2—running the search engine, and step 3—postprocessing) can be run twice to enhance the final results. The difference between the $1^{st}$ run and the $2^{nd}$ run is that the $2^{nd}$ run is performed without pipes included in projects generated in $1^{st}$ run. As described supra, the job planner can sometimes generate sub-optimal results. The $2^{nd}$ run has been found to help the job planner generate more thoroughly searched results. According to some embodiments, the job planner can compare the results of $1^{st}$ run and $2^{nd}$ run equally and generate final results.

According to some embodiments the described systems and methods can be applied to assets other than drinking water supply, such as pipes for carrying other fluid, such as waste water, recycled water, brackish water, storm water, sea water, steam, compressed air, oil and natural gas. According to some embodiments, the described systems and methods can be applied to networks of fiber cables, electrical wires, as well as to utility poles.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. A method of improving a network of interconnected underground pipes, including by replacing pipes of said network, through projects each including plural pipes of said network, the method comprising:

receiving by a computer system a calculated risk of failure value for each of a plurality of the underground pipes, said value being selected from a range that includes at least 10 different values;

searching through said plurality of assets and generating a plurality of potential improvement projects, each of the potential improvement projects including merging into an individual project a plurality of interconnected pipes of the interconnected network of underground pipes, wherein the generating of a potential improvement project is based at least in part on the risk of failure value of each of the pipes included in the potential improvement project, and improving the network of underground pipes accordingly; and preprocessing said plurality of assets thereby generating a reduced set of said plurality of pipes;

wherein said searching comprises searching through said reduced set.

2. A method according to claim 1 wherein the risk of failure value includes a value representing likelihood of failure.

3. A method according to claim 2 wherein said value representing likelihood of failure is a probability of failure percentage.

4. A method according to claim 1 wherein the risk of failure value includes a value representing consequence of failure.

5. A method according to claim 1 wherein the risk of failure value includes a value representing business risk exposure.

6. A method according to claim 1 wherein said preprocessing includes one or more of the following selected from a group consisting of: merging shorter pipes into longer pipes; excluding groups of pipes that are do not meet defined thresholds; excluding pipes having only a single interconnection and having low risk of failure value; and merging into a single project pipes having similar risk of failure values.

7. A method according to claim 1 wherein said interconnected pipes comprise linear segments.

8. A method according to claim 7 wherein said potential improvement projects are potential pipe replacement projects.

9. A method according to claim 7 wherein said potential improvement projects include one or more types selected from a group consisting of:
pipe rehabilitation, pipe inspection, leak detection, and pipe condition assessment.

10. A method according to claim 9 wherein said pipe segments form a network for carrying water to consumers.

11. A method according to claim 9 wherein said pipe segments are configured to carry fluid of a type selected from a group consisting of:
fresh water; waste water; recycled water; brackish water; storm water; sea water; drinking water; steam; compressed air; oil; and natural gas.

12. A method according to claim 1 further comprising:
displaying on a graphical user interface the plurality of potential improvement projects; and receiving selections of or modifications to one or more of the potential improvement projects from said user.

13. A method according to claim 12 wherein said displaying includes a map view.

14. A method according to claim 1 further comprising:
displaying on a graphical user interface potential improvement project plans each of which includes one or more potential improvement projects; and receiving selections from the user for one or more of the following selected from a group consisting of: editing the project plans; comparing the project plans; merging the project plans; and splitting the project plans.

15. A method according to claim 14 wherein said displaying includes a table view.

16. A method of improving a network of interconnected underground pipes, including by replacing pipes in said network, through projects each including plural pipes in said network, the method comprising:
receiving by a computer system a calculated risk of failure value for each of a plurality of the underground pipes, said value being selected from a range that includes at least 10 different values,
searching through said plurality of assets and generating a plurality of potential improvement projects, each of the potential improvement projects including merging into an individual project a plurality of interconnected pipes of the interconnected network of underground pipes, wherein the generating of a potential improvement project is based at least in part on the risk of failure value of each of the pipes included in the potential improvement project, and improving the network of underground pipes accordingly; and
further comprising postprocessing said plurality of potential improvement projects to add to at least one of the potential projects a pipe that is connected to the plurality of the interconnected pipes of the potential project.

17. A method according to claim 16 wherein said adding is based on the risk of failure value of the pipe to be added and/or whether a combined risk of failure value for the potential improvement project is increased or decreased by adding the pipe.

18. A method of improving a network of interconnected underground pipes, including by replacing pipes in said network, through projects each including plural pipes in said network, the method comprising:
receiving by a computer system a calculated risk of failure value for each of a plurality of the underground pipes, said value being selected from a range that includes at least 10 different values;
searching through said plurality of assets and generating a plurality of potential improvement projects, each of the potential improvement projects including merging into an individual project a plurality of interconnected pipes of the interconnected network of underground pipes, wherein the generating of a potential improvement project is based at least in part on the risk of failure value of each of the pipes included in the potential improvement project, and improving the network of underground pipes accordingly; and
further comprising postprocessing said plurality of potential improvement projects to merge two or more potential improvement projects into a single potential improvement project.

19. A system for improving a network of interconnected underground pipes, including by replacing pipes of said network, through projects each including plural pipes of said network, the system comprising:
a database that stores a calculated risk of failure value for each of a plurality of the pipes, said value being selected from a range that includes at least 10 different values;
a processing system configured to automatically search through said plurality of pipes and generate a plurality of potential improvement projects, each of the potential improvement projects including a plurality of interconnected pipes of the network of interconnected underground pipes, wherein the generation of a potential improvement project is based at least in part on the risk of failure value of each of the pipes included in the potential improvement project, for improving said network of underground pipes accordingly; and
further comprising postprocessing said plurality of potential improvement projects to merge two or more potential improvement projects into a single potential improvement project.

20. A system according to claim 19 wherein the risk of failure value includes a value representing likelihood of failure, consequence of failure or business risk exposure.

21. A system according to claim 19 wherein the risk of failure value includes a value representing a likelihood of failure expressed as a percentage value.

22. A system according to claim 19 wherein said interconnected managed assets are linear pipe segments forming a network for carrying water to consumers and said potential improvement projects are potential pipe replacement projects.

23. A system according to claim 19 wherein said interconnected managed assets are pipe segments configured to carry fluid of a type selected from a group consisting of: fresh water; waste water; recycled water; brackish water; storm water; sea water; drinking water; steam; compressed air; oil; and natural gas.

* * * * *